(12) United States Patent
Shi et al.

(10) Patent No.: US 11,251,948 B2
(45) Date of Patent: Feb. 15, 2022

(54) ENCRYPTION AND DECRYPTION METHOD AND SYSTEM WITH CONTINUOUS-VARIABLE QUANTUM NEURAL NETWORK

(71) Applicant: CENTRAL SOUTH UNIVERSITY, Hunan (CN)

(72) Inventors: Jinjing Shi, Changsha (CN); Shuhui Chen, Changsha (CN); Yanyan Feng, Changsha (CN); Yuhu Lu, Changsha (CN); Tongge Zhao, Changsha (CN); Yongze Tang, Changsha (CN); Zhenhuan Li, Changsha (CN); Wenxuan Wang, Changsha (CN); Wei Lai, Changsha (CN); Duan Huang, Changsha (CN); Ronghua Shi, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 118 days.

(21) Appl. No.: 16/910,594

(22) Filed: Jun. 24, 2020

(65) Prior Publication Data
US 2020/0412532 A1     Dec. 31, 2020

(30) Foreign Application Priority Data
Jun. 28, 2019   (CN) .......................... 201910574143.6

(51) Int. Cl.
*H04L 9/08*   (2006.01)
*H04L 9/30*   (2006.01)

(52) U.S. Cl.
CPC .......... *H04L 9/0858* (2013.01); *H04L 9/0869* (2013.01); *H04L 9/302* (2013.01)

(58) Field of Classification Search
CPC ..... H04L 9/0858; H04L 9/0869; H04L 9/302; H04L 9/0618; H04L 9/12; H04L 9/0852; H04L 9/08; H04L 9/30
See application file for complete search history.

(56) References Cited

U.S. PATENT DOCUMENTS

2005/0025053 A1   2/2005   Izzat et al.
2006/0262876 A1   11/2006  LaDue
(Continued)

FOREIGN PATENT DOCUMENTS

CN    101030848 A    9/2007
CN    102904710 A    1/2013
(Continued)

OTHER PUBLICATIONS

Wu, Bichuan. "The Evaluation of Continuous Variable Quantum Communication Channel." China Master's Theses Full-text Database. China Academic Journal Electronic Publishing House. May 15, 2018. 11 pages. English Abstract provided.
(Continued)

*Primary Examiner* — Quazi Farooqui
(74) *Attorney, Agent, or Firm* — Maier & Maier, PLLC

(57) ABSTRACT

A method and a system for encryption and decryption based on continuous-variable quantum neural network CVQNN. The method includes: updating a weight of the CVQNN with a training sample; triggering, by a sender, a legal measurement bases synchronization between the sender and the CVQNN; converting, by the sender, the information to be sent into a quadratic plaintext according to the synchronized measurement bases, and sending the quadratic plaintext to the CVQNN; encrypting, by the CVQNN, a received quadratic plaintext, and sending an encrypted quadratic plaintext to a receiver; after receiving the encrypted quadratic plaintext, sending by the receiver the encrypted quadratic plaintext to the CVQNN for decryption to obtain
(Continued)

decrypted information. The embodiments implement data encryption and decryption by introducing CVQNN model and synchronization measurement technology. The embodiments provide advantages of high reliability, high security and easy realization.

16 Claims, 4 Drawing Sheets

(56) References Cited

U.S. PATENT DOCUMENTS

| | | |
|---|---|---|
| 2011/0093913 A1 | 4/2011 | Wohlert et al. |
| 2017/0034167 A1* | 2/2017 | Figueira .............. H04L 63/0428 |
| 2021/0192381 A1* | 6/2021 | Ijaz ........................ G06N 10/00 |

FOREIGN PATENT DOCUMENTS

| | | |
|---|---|---|
| CN | 103746799 A | 4/2014 |
| CN | 106464848 A | 2/2017 |
| CN | 107231214 A | 10/2017 |

OTHER PUBLICATIONS

Chen, Jialin et al. "A quantum-implementable neural network model." Quantum Inf Process. Aug. 24, 2017. 24 pages.

Chinese Office Action dated Feb. 3, 2021, in connection with corresponding CN Application No. 201910574143.6 (8 pp., including machine-generated English translation).

* cited by examiner

ENCRYPTION AND DECRYPTION METHOD AND SYSTEM WITH CONTINUOUS-VARIABLE QUANTUM NEURAL NETWORK

CROSS-REFERENCE TO RELATED APPLICATIONS

The present application claims priority to Chinese patent application No. 201910574143.6, filed on Jun. 28, 2019, which is incorporated by reference in its entirety.

TECHNICAL FIELD

Embodiments of the present disclosure relate to cryptography technologies and, in particular, to an encryption and decryption method and system with continuous-variable quantum neural network.

BACKGROUND

With the quick development of the internet, information security, one of hot topics, plays a more and more important role in the present era. In the classical cryptography, majority of cryptography algorithms enhance the security of information through relaying on mathematical problems those are hard to solve. However, the development of quantum computing poses a threat to these cryptographic algorithms based on mathematical complexity. For example, RSA, a famous classical public key mechanism, improves the security of algorithms by using the property that large integer is hard to be factorized. However, it has been found that the quantum search algorithm Shor's can calculate the factorization of large numbers in polynomial time, that is, the classical Non-deterministic Polynomial (NP) problem is transformed into the quantum P problem, which could be a nonnegligible threat to the RSA algorithm. Therefore, in order to keep the network information security, researchers pay much attention on post-quantum algorithms to resist the attacks from the powerful quantum computing on the classical cryptographic algorithm.

Artificial neural network (ANN) with the characteristics of multiple structures and unoriented property is widely researched in recent decades. Combing ANN with cryptography can form different types of cryptosystems. Weights exchanging between two set of ANNs, or even among more set of ANNs, has been implemented by random synchronization based on partial information or timing delay methods or the like. On this basis, the private key can be shared, and the hidden chaotic signals of Hopfield neural network can be revealed to process data. In addition, the fact that a trained ANN can be utilized to encrypt and decrypt data is proved based on the synchronization and learning mechanism, which is similar to the black model of quantum computing in fact. Hence, involving quantum computing into ANN, so-called quantum neural network (QNN), can be available. So far, QNN aims at solving hard problems in the classical or physical fields and is more powerful than classical machine learning with respect to some aspects.

At present, the main method of the quantum cryptography still combines quantum key distribution with classical "one-time pad" method so as to effectively solve the problem of the key distribution. However, these methods will generate and consume lots of keys in practical applications. Qubits can carry more information than classical bits due to its superposition, and ANN can parallelly process data, which both will accelerate the speed of processing data. As a result, QNN as one of the quantum machine learning methods can reduce the high requirement of key. In addition, the quantum neural network has the characteristics of quantum natural properties (quantum entanglement, quantum immeasurability) and non-directional and multi-structure properties of neural network, which not only greatly improve the performance of processing data, but also ensure the security of the system. In recent years, a discrete-variable quantum neural network (DVQNN) and corresponding applications thereof have been successively proposed. Both the optimization of QNN based on variational algorithm and classification scheme using QNN all enhance the practical application process of QNNs. In 2016, an encryption scheme based on DVQNN was proposed to encrypt data, in which there are some questions that the discrete quantum sources are difficult to be prepared, and the self-made gradient algorithm is hard to be implemented with quantum circuits, i.e., the overall process of realization is not effective in reality. Compared with DVQNN, input sources of a continuous-variable quantum neural network (CVQNN), namely quantum sources (such as Gaussian states), are easier to be prepared than discrete variables. In 2018, CVQNN was proposed firstly and then, used to solve lots of classical questions, such as curve fitting, codec and quantum states preparation and the like.

However, the applications and studies based on CVQNN in data encryption and decryption has not been researched in current studies.

SUMMARY

Embodiments of the present disclosure provide a cryptographic method for encrypting and decrypting quantum plaintext or classical plaintext, which are used to solve the problem that the current cryptosystems could not be secure enough to prevent transformed data from being attacked by powerful attackers.

Embodiments of the present disclosure intend to provide an encryption and decryption method and system with continuous-variable quantum neural network based on CVQNN with the advantages of high reliability, security and easy implementation.

An encryption and decryption method based on the CVQNN provide by the present disclosure, including:

updating, by the CVQNN, a weight of the CVQNN with a training sample;

triggering, by a sender, a legal measurement bases synchronization (LMB) between the sender and the CVQNN;

converting, by the sender, information to be sent into a quadratic plaintext according to synchronized measurement bases, and sending the quadratic plaintext to the CVQNN;

encrypting, by the CVQNN, a received quadratic plaintext, and sending an encrypted quadratic plaintext to a receiver;

after the receiver receives the encrypted quadratic plaintext, sending by the receiver the encrypted quadratic plaintext to the CVQNN for decryption to obtain decrypted information.

In an embodiment, the updating, by the CVQNN, a weight of the CVQNN with a training sample, includes:

repeatedly updating, by the CVQNN, the weight of the CVQNN according to the training sample until a loss value of the CVQNN loss function is less than a preset threshold.

In an embodiment, the repeatedly updating, by the CVQNN, the CVQNN according to the training sample until the loss value of the CVQNN loss function is less than the preset threshold, includes:

repeatedly updating, by the CVQNN, the weight of the CVQNN according to the training sample using Adam optimization algorithm, until the loss value of the CVQNN loss function is less than the preset threshold.

In an embodiment, the triggering, by the sender, the legal measurement bases synchronization between the sender and the CVQNN, includes:

generating, by the sender, a quantum state according to a first measurement bases set selected randomly, and sending a generated quantum state to the CVQNN;

measuring, by the CVQNN, a received quantum state by using a second measurement bases set selected randomly, to obtain a first serial number, and sending the first serial number to the sender;

determining, by the sender, synchronized measurement bases according to a received first serial number, and then sending the synchronized measurement bases to the CVQNN.

In an embodiment, before the converting, by the sender, the information to be sent into a quadratic plaintext according to the synchronized measurement bases, and sending the quadratic plaintext to the CVQNN, the method further includes:

sending, by the sender, the information to be sent to the CVQNN;

sending the quantum state information back to the sender if the CVQNN determines that the information to be sent is quantum state information;

converting, if the CVQNN determines that the information to be sent is bit information, the bit information into the quantum state information through a displacement gate in vacuum state, and sending a converted quantum information to the sender.

In an embodiment, the encrypting, by the CVQNN, the received quadratic plaintext, and sending the encrypted quadratic plaintext to the receiver, includes:

calculating an expected value for an outputted data of the CVQNN according to the received quadratic plaintext;

calculating an value of a first error correction function according to the expected value;

combining a first hidden output of the CVQNN with the value of the first error correction function to obtain the encrypted quadratic plaintext;

sending the encrypted quadratic plaintext to the receiver through a communication channel.

In an embodiment, after the receiver receives the encrypted quadratic plaintext, the sending by the receiver the encrypted quadratic plaintext to the CVQNN for decryption to obtain decrypted information, includes:

parsing, by the receiver, the encrypted quadratic plaintext to obtain values of the second hidden output and the second error correction function of the CVQNN;

sending, by the receiver, the second hidden output to the CVQNN, and receiving an output result returned by the CVQNN; and determining, by the receiver, the quadratic plaintext according to the output result and the value of the second correction function, and determining the decrypted information according to the quadratic plaintext.

In an embodiment, after the receiver receives the encrypted quadratic plaintext, the sending by the receiver the encrypted quadratic plaintext to the CVQNN again for decryption to obtain decrypted information, further includes:

sending, by the receiver, the determined quadratic plaintext to the CVQNN again, and receiving a third hidden output returned by the CVQNN;

determining by the receiver that the information to be sent has not been maliciously modified, if the third hidden output is the same as the second hidden output; and determining by the receiver that the information to be sent has been modified, if the third hidden output is different from the second hidden output.

Another encryption and decryption method based on CVQNN further provided by the present disclosure, includes:

updating the CVQNN with a training sample;

performing a measurement bases synchronization between the sender and a receiver;

converting, by the sender, classical data required to be encrypted into a quantum state;

converting, by the sender, information to be sent into a quadratic plaintext according to synchronized measurement bases, and sending the quadratic plaintext to the CVQNN;

encrypting, by the CVQNN, a received quadratic plaintext, and sending an encrypted quadratic plaintext to a receiver;

after the receiver receives the encrypted quadratic plaintext, sending by the receiver the encrypted quadratic plaintext to the CVQNN again for decryption to obtain decrypted information.

In an embodiment, before the converting, by the sender, the information to be sent into a quadratic plaintext according to the synchronized measurement bases, the method further includes:

converting, if the sender determines that the information to be sent is bit information, the bit information into the quantum state information to be sent through a displacement gate in vacuum state;

the converting, by the sender, the information to be sent into a quadratic plaintext according to the synchronized measurement bases, includes:

the converting, by the sender, the quantum state information to be sent into a quadratic plaintext according to the synchronized measurement bases.

In an embodiment, the performing a measurement bases synchronization between the sender and the receiver, includes:

generating, by the sender, a quantum state according to a first measurement bases set selected randomly, and sending a generated quantum state to the receiver;

measuring, by the sender, a received quantum state by using a second measurement bases set selected randomly, to obtain a first serial number, and sending the first serial number to the sender;

determining, by the sender, synchronized measurement bases according to a received first serial number, and then sending the synchronized measurement bases to the receiver.

An encryption and decryption system based on CVQNN further provided by the present disclosure includes a sender, the CVQNN and a receiver, where:

the CVQNN is configured to update a weight of the CVQNN with a training sample;

the sender is configured to trigger measurement bases synchronization between the sender and the CVQNN;

the sender is configured to convert the information to be sent into a quadratic plaintext according to synchronized measurement bases, and send the quadratic plaintext to the CVQNN;

the CVQNN is configured to encrypt a received quadratic plaintext and send an encrypted quadratic plaintext to the receiver;

the receiver is configured to send, after receiving the encrypted quadratic plaintext, the encrypted quadratic plaintext to the CVQNN for decryption to obtain decrypted information.

In an embodiment, the CVQNN is further configured to:
update the weight of the CVQNN according to the training sample until a loss value of the CVQNN loss function is less than a preset threshold.

In an embodiment, the CVQNN is further configured to:
repeatedly update the weight of the CVQNN according to the training sample using Adam optimization algorithm, until the loss value of the CVQNN loss function is less than the preset threshold.

In an embodiment, the sender is further configured to:
generate a quantum state according to a first measurement bases set selected randomly, and send a generated quantum state to the CVQNN;
where the CVQNN is further configured to measure the received quantum state using a second measurement bases set selected randomly to obtain a first serial number, and send the first serial number to the sender; and
the sender is further configured to determine the synchronized measurement bases according to a received first serial number, and then send the synchronized measurement bases to the CVQNN.

In an embodiment, the sender is further configured to:
send the information to be sent to the CVQNN;
where the CVQNN is further configured to send quantum state information back to the sender if the CVQNN determines that the information to be sent is the quantum state information; convert, if the CVQNN determines that the information to be sent is bit information, the bit information into the quantum state information through a displacement gate in vacuum state, and send a converted quantum information to the sender.

In an embodiment, the CVQNN is further configured to:
calculate an expected value for an outputted data of the CVQNN according to the received quadratic plaintext;
calculate an value of a first error correction function according to the expected value;
combine a first hidden output of the CVQNN with the value of the first error correction function to obtain the encrypted quadratic plaintext;
send the encrypted quadratic plaintext to the receiver through a communication channel.

In an embodiment, the receiver is further configured to:
parse the encrypted quadratic plaintext to obtain values of a second hidden output and a second error correction function of the CVQNN;
send the second hidden output to the CVQNN, and receive an output result returned by the CVQNN;
determine the quadratic plaintext according to the output result and the value of the second correction function, and determine the decrypted information according to the quadratic plaintext.

In an embodiment, the receiver is further configured to:
send the determined quadratic plaintext to the CVQNN again, and receive a third hidden output returned by the CVQNN;
determine that the information to be sent has not been maliciously modified if the third hidden output is the same as the second hidden output;
determine that the information to be sent has been modified if the third hidden output is different from the second hidden output.

Compared with the existing data encryption method, the data encryption method based on the CVQNN provided by the present disclosure has the following advantages. First, the continuous-variable quantum source is experimentally easy to be obtained, easy to be prepared, easy to be measured, easy to be handled and so on, so the designed scheme has the characteristics of high detection efficiency, high repetition rate and easy realization in the laboratory of continuous variable quantum cryptography. Second, due to the quantum uncertainty principle and the quantum noncloning theorem, and the introduction of the synchronized measurement bases, the true information will not be obtained by the attacker during the transmission process, and the eavesdropping behavior can be detected by the communicator, and therefore, the correspondent can prevent the communication behavior in time to prevent the information from being leaked. Finally, the combination of quantum computing and neural network can increase the speed of data processing, and the neural network has multiple key parameters, which further increases the difficulty of attackers attacking the system; hence, the method of the present disclosure has high reliability and high security and is implemented easily.

BRIEF DESCRIPTION OF DRAWINGS

To describe the technical solutions in embodiments of the present disclosure more clearly, the following briefly introduces the accompanying drawings needed for describing the embodiments or the prior art. Apparently, the accompanying drawings in the following description illustrate merely some embodiments of the present disclosure, and persons of ordinary skill in the art may still derive other drawings from these accompanying drawings without creative effort.

DETAILED DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

In continuous-variable quantum models, information is usually carried by bosons, denoted as qumodes. The quantum state preparation, unitary operation and quantum state measurement can be realized by quantifying the continuous orthogonal amplitude of magnetic field. Hence, it is easier to implement CVQNN than DVQNN in quantum physical devices.

Figure 2:
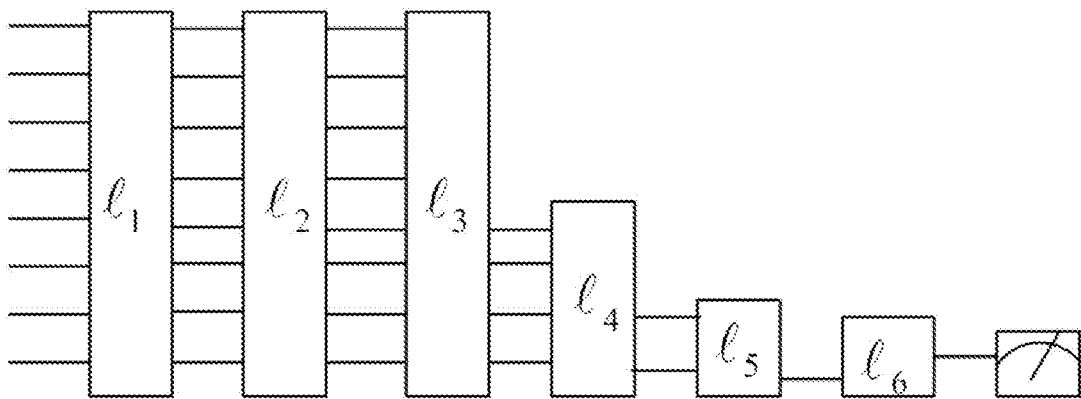
FIG. 2 is a schematic diagram of the generalized CVQNN model for the present invention method.

A generalized CVQNN model is shown in FIG. 2, which demonstrates that CVQNN can have multiple layers, and the size of a rear layer can be reduced by trading out quantum states or measuring quantum states. The output quantum state may subject to a quantum measuring device to obtain desired information carried by the quantum state.

Figure 3:
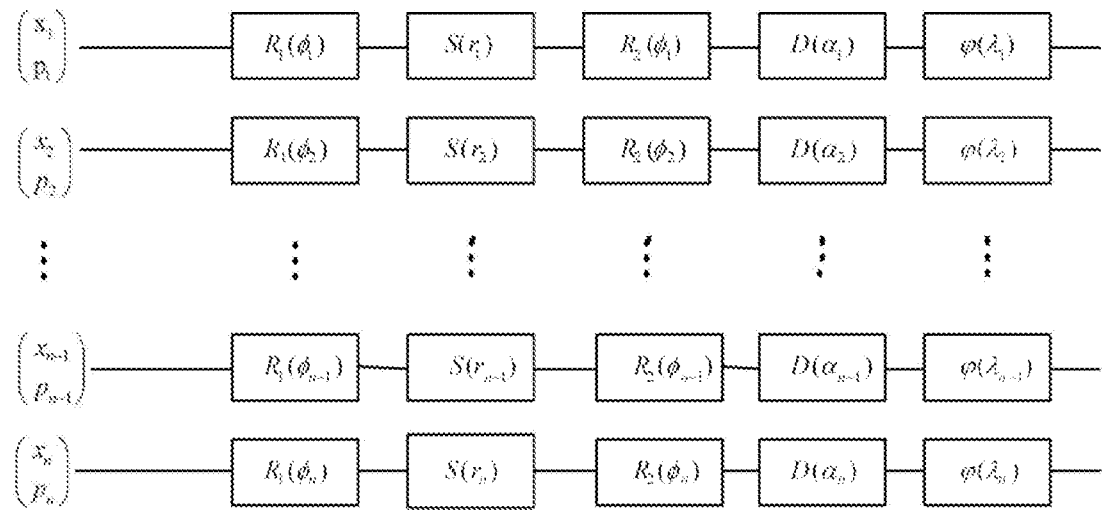
FIG. 3 is a schematic diagram of the specific neuron layers for the present invention method.

A generalized CVQNN model can fix unitary operations of each layer, and these unitary operations can have a computation form y=φ(wx+b) of the classical neural network, where W is weight matrix, x is input data vector, b is bias vector and φ is nonlinear function. Hence, the specific composition of each neural layer can be obtained as shown in FIG. 3, which is denoted as the equation $l:=(\varphi \circ D \circ R_2 \circ S \circ R_1)$, where both $R_1$ and $R_2$ are single-mode gates $R(\varphi)=\exp(i\varphi \hat{a}^\dagger \hat{a})$, S is a squeeze operation, and $$S(z) = \exp\left(\frac{r}{2}\left(e^{-i\phi}\hat{a}^2 - e^{i\phi}\hat{a}^{\dagger 2}\right)\right),$$

D is displacement operation, and $D(r)=\exp(r(e^{i\phi}\hat{a}^\dagger - e_{-i\phi}\hat{a}))$, where $\hat{a}$ and $\hat{a}^\dagger$ denote an annihilation operator and a generation operator respectively.

The mathematical isomorphism between neurons proves that CVQNN can be used to encrypt and decrypt data. Let $U_{R_2}U_SU_{R_1}=U$, and $U_{i\{i=R_1,S,R_2\}}$ represents Gaussian operations, the mathematical express of CVQNN can be seen as:

$$\hat{y}_1 = \varphi\left(\sum_{j=1}^n U_{1,j}\hat{x}_j + \alpha_1\right),$$

where $U_{1,j\{j=1, 2, \ldots, n\}}$ denotes unitary operations between $\hat{y}_1$ and $\hat{x}_j$, and $\alpha_1$ denotes an inner parameter of a displacement gate. By the above expression, the mathematical expression of CVQNN can further be described as:

$$\hat{y}_i=\varphi(\Sigma_{j=1}^n U_{i,j}\hat{x}_j+\alpha_i)(i=2, \ldots m).$$

According to the above description, a general equation of CVQNN is:

$$y=\varphi(U\hat{x}+\alpha),$$

where $$\hat{y} = \begin{bmatrix} \hat{y}_1 \\ \hat{y}_2 \\ \vdots \\ \hat{y}_m \end{bmatrix}, \alpha = \begin{bmatrix} \alpha_1 \\ \alpha_2 \\ \vdots \\ \alpha_n \end{bmatrix}, U = \begin{bmatrix} U_{1,1} & U_{1,2} & \ldots & U_{1,n} \\ U_{2,1} & U_{2,2} & \ldots & U_{2,n} \\ \vdots & \vdots & \vdots & \vdots \\ U_{m,1} & U_{m,2} & \ldots & U_{m,n} \end{bmatrix}$$

Since all quantum operations are unitary operations, by means of a series of inverse unitary operation, the initial input information of the network can be obtained easily:

$$\hat{x}=V(U^{-1}(\hat{y}-\phi(\alpha)))$$

Here, it is proved mathematically that QNN can be utilized in the design of cryptosystem, which contains multiple key parameters to ensure the security of information.

Figure 4:
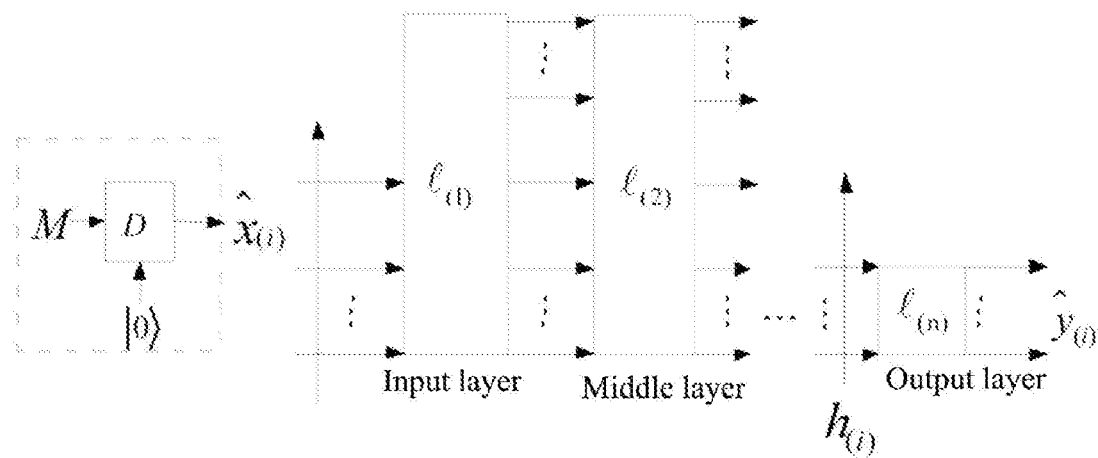
FIG. 4 is a schematic diagram of the multilayer CVQNN for the method according to the present disclosure.

Therefore, the present invention proposes a data transmission method based on CVQNN, the principle of which is shown in FIG. 4. $h_{(i)}$ denotes the output of a middle layer, which is used for certification of quantum information. In the process of message certification (shown in the dashed block of FIG. 6), the middle outputs $h_{(i)}'$ and $h_{(i)}$ are compared: if $\langle h_{(i)}'|h_{(i)}\rangle=0$, it means that the information is not been changed during the transmission, i.e., the process of message certification can be completed successfully. In addition, the dashed block in FIG. 4 denotes the preprocessing for information. The proposed cryptosystem with the combination of ANN and quantum computing presented a novel encryption and decryption scheme. The security analysis and performance analysis prove that QNN can be used for data encryption processing, with higher security and faster processing speed.

Figure 1:
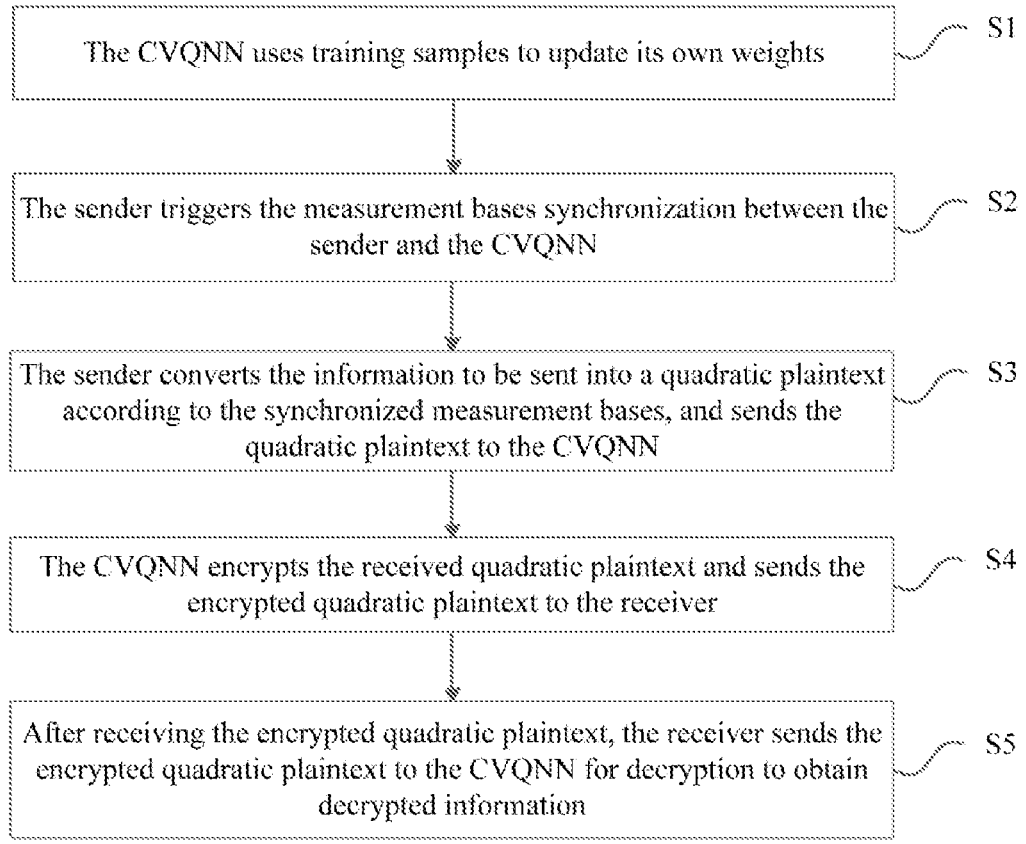
FIG. 1 is a schematic diagram of the general scheme for the present invention method.

The encryption and decryption method based on the CVQNN provided by the present disclosure is shown in FIG. 1 and includes the following steps:

S1. The CVQNN uses training samples to update its own weights.

In an embodiment, the step S1 may include: the CVQNN repeatedly updates its weights according to the training sample until a loss value of the CVQNN loss function is less than a preset threshold.

In an embodiment, the step that CVQNN repeatedly updates its weights according to the training sample until the loss value of the CVQNN loss function is less than the preset threshold, includes:

the CVQNN repeatedly updates the weight of the CVQNN according to the training sample using the Adam optimization algorithm, until the loss value of the CVQNN loss function is less than the preset threshold.

S2. The sender triggers the measurement base synchronization between the sender and the CVQNN.

In an embodiment, the measurement bases synchronization between the sender and the CVQNN is performed by the following steps that:

the sender generates quantum states according to a first measurement bases set selected randomly, and sends the generated quantum states to the CVQNN;

the CVQNN measures the received quantum state by using a second measurement bases set selected randomly, to obtain a first serial number, and sends the first serial number to the sender;

the sender determines synchronized measurement bases according to the received first serial number, and then sends the synchronized measurement bases to the CVQNN.

S3. The sender converts the information to be sent into a quadratic plaintext according to the synchronized measurement bases, and sends the quadratic plaintext to the CVQNN.

In an embodiment, before the step S3, it further includes that:

the sender sends the information to be sent to the CVQNN;

if the CVQNN determines that the information to be sent is quantum information, then the CVQNN sends the quantum information back to the sender; if the CVQNN determines that the information to be sent is bit information, and then the bit information is converted into quantum state information through a displacement gate in vacuum states i.e., $$M|0\rangle \overset{D}{\leftrightarrow} \hat{x},$$

and the converted quantum state information is sent to the sender.

S4. The CVQNN encrypts the received quadratic plaintext and sends the encrypted quadratic plaintext to the receiver.

In this embodiment, the step S4 includes:

calculating an expected value of the output data of the CVQNN according to the received quadratic plaintext;

calculating an value of a first error correction function according to the expected value;

combining a first hidden output of the CVQNN with the value of the first error correction function to obtain an encrypted quadratic plaintext;

sending the encrypted quadratic plaintext to the receiver through a communication channel.

Figure 5:
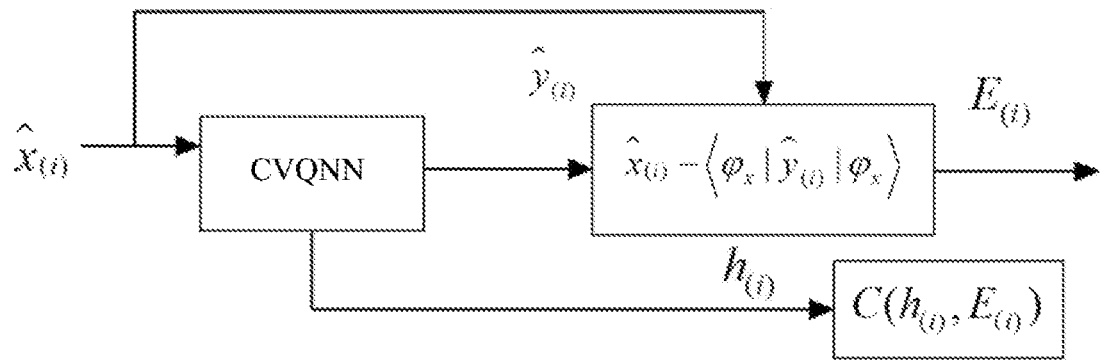
FIG. 5 is a schematic diagram of the specific encryption process based on the CVQNN for the method according to the present disclosure.

According to input dimension of the neural network, quantum information $\hat{x}$, $\hat{x}$ can be decomposed into plaintext information $\hat{x}:=\{\hat{x}_{(1)}, \hat{x}_{(2)}, \ldots, \hat{x}_{(n)}\}$. A schematic diagram of a specific encryption progress based on CVQNN is shown in FIG. 5. As shown in FIG. 5, information $\hat{x}_{(i)}$ is inputted into the CVQNN to be processed to obtain a cipher $\hat{y}_{(i)}$ and the CVQNN can be regarded as a black box. The expected value of $\hat{y}_{(i)}$ is denoted as $\langle \varphi_x | \hat{y}_{(i)} | \varphi_x \rangle$ where $\varphi_x$ is the output of quantum circuit of a given input $D(x)|0\rangle$. Hence, the encrypted quadratic plaintext or cipher block $C(h_{(i)}, E_{(i)})$ sent to the receiver can be formed by the first error function $E_{(i)} = \hat{x}_{(i)} - \langle \varphi_x | \hat{y}_{(i)} | \varphi_x \rangle$ and the first hidden output of CVQNN.

S5. After receiving the encrypted quadratic plaintext, the receiver sends the encrypted quadratic plaintext to the CVQNN for decryption to obtain decrypted information.

In an embodiment, the step S5 includes that:

the receiver parses the encrypted quadratic plaintext to obtain the values of the second hidden output and the second error correction function of the CVQNN;

the receiver sends the second hidden output to the CVQNN, and receives an output result returned by the CVQNN; and the receiver determines the quadratic plaintext according to the output result and the value of the second correction function, and determines the decrypted information according to the quadratic plaintext.

In an embodiment, after the step S5, the method further includes that:

the receiver sends the determined quadratic plaintext to the CVQNN again, and receives a third hidden output returned by the CVQNN;

the receiver determines that the information to be sent has not been maliciously modified, if the third hidden output is the same as the second hidden output;

the receiver determines that the information to be sent has been modified, if the third hidden output is different from the second hidden output.

Furthermore, if the third hidden output is the same as the second hidden output, it means that the quantum state information has not been modified. The reason of being modified may be natural noise or attacks. If the influence of natural noise is eliminated, it can prove that there is an attacker in the communication process, and thus the communicator can choose terminating the communication.

Figure 6:
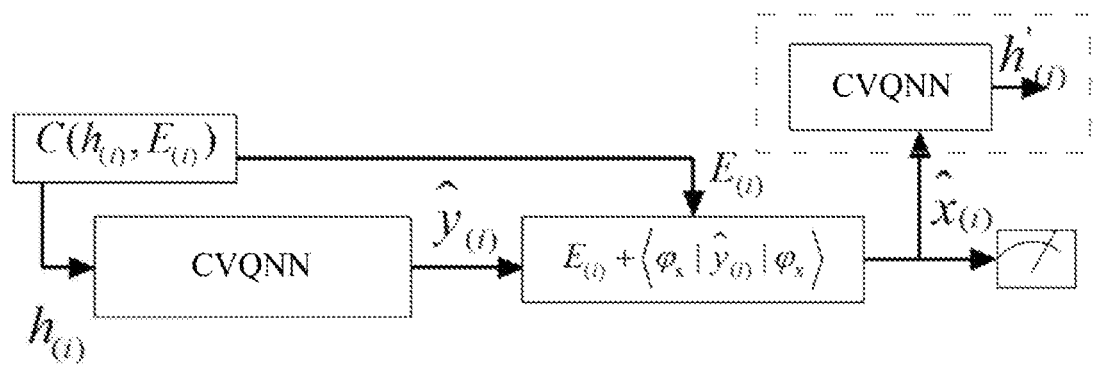
FIG. 6 is a schematic diagram of the specific decryption process based on the CVQNN for the method according to the present disclosure.

FIG. 6 is a schematic diagram of the specific decryption process based on CVQNN for the method according to the present disclosure. As shown in FIG. 6, the encrypted quadratic plain (cipher block) $C(h_{(i)}, E_{(i)})$ is parsed out to obtain the second hidden output $h_{(i)}$ and $E_{(i)}$. $h_{(i)}$ is inputted into the identical CVQNN to acquire the output result $\hat{y}_{(i)}' = \hat{y}_{(i)}$, then plain $\hat{x}_{(i)}$ is obtained from $\hat{y}_{(i)}'$ by the calculation of $E_{(i)} + \langle \varphi_x | \hat{y}_{(i)}' | \varphi_x \rangle$. $\hat{x}_{(i)}$ could be inputted into the CVQNN again to obtain the third hidden output $h_{(i)}'$. If $\langle (h_{(i)} | h_{(i)}') \rangle = \delta(h_{(i)}' - h_{(i)}) = 0$, that is, the result is 0, it means that the quantum information is not changed, and hence the communication can be continued.

Figure 7:
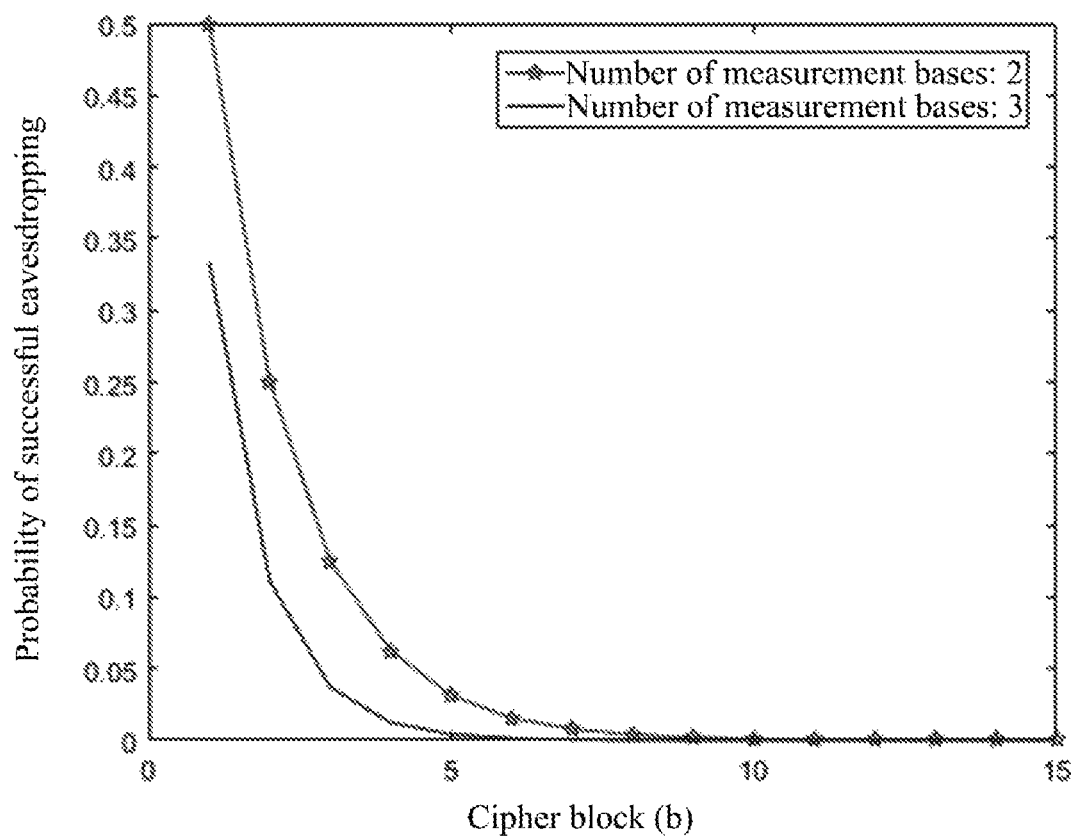
FIG. 7 shows the probability of the attacker eavesdropping on cipher for the method according to the present disclosure, in case of the introduction of legal measurement bases (LMB).

FIG. 7 is a probability schematic of an attacker eavesdropping on the cipher for the method according to the present disclosure, in the case of the introduction of LMB. As shown in FIG. 7, before sending data, the sender may perform a process of synchronizing LMB with CVQNN. The idea of the progress of synchronizing LMB is similar to BB84 protocol where entanglement quantum states unaffected by the environment or an attacker are chosen to be measured by using several pairs of entanglement quantum states, and a one-to-one correspondence between the measured values and LMB is ensured. The whole process can ensure that LMB can be synchronized at both sides of the communicators, and that the choice of the legal measurement bases cannot be known by attackers. Every time a piece of data generated from the sender under a fixed legal measurement bases is sent, assuming that an attacker has captured cipher, but the attacker cannot use a corresponding legal measurement bases to measure the cipher accurately because he does not have the corresponding legal measurement bases, as a result, it is difficult to obtain true information. In the case of two or three groups of legal measurement bases, the probability of eavesdropping on cipher is almost zero for the attacker, as long as the number of cipher block reaches six to ten groups.

In addition, the cryptosystem can prevent the message replaying from attackers. Due to quantum non-cloning theorem, attackers only can prepare new quantum states as fake information to send to the receiver. In this case, it is necessary for information authentication formed by the cryptosystem. Suppose that there is a powerful attacker, who can generate data $C'(h'_{(i)}, E'_{(i)})$ that matches the cipher block by some means, and passes one information authentication at one time. It requires the classical computer to have huge enough computing power, such as $Q(2^{2n})$ operations, to pass the whole information authentication for n-bit plaintext. It requires huge resources and computing power for attackers, that is, not only a large amount of quantum sources to generate fake cipher is required, but also the correlation between the combination of cipher can only be computed by brute force, and the probability of passing the authentication by an attacker at one time is only $$\frac{1}{2^{2n} + 2^{n+1}}.$$

In addition, the attacker may intercept the quantum plaintext and the corresponding cipher to construct a similar cryptosystem, and then use the simulated cryptosystem to decrypt the obtained cipher, so that the attacker does not need to know how to choose the LMB, but can get true information. Researches show that if the weight (key) of the neural network is kept static or little changed in a relatively small range, then the neural network could be simulated. It is a non-negligible attack for key sharing realized based on neural network synchronization technology. Considering this, it can increase the difficulty of simulating the cryptosystem for an attacker by maintaining the range of weights in a relatively large range. Mimicking the TCP congestion mechanism can achieve the above goal. Set a parameter $\alpha$ and compare it with the value of loss function $\beta$. The comparison result is used to control the learning rate. When α<β, the learning rate could be increased by multiplying by a factor greater than 1, otherwise, it can be reduced by multiplying a factor less than 1. By means of such a mechanism, the attacker cannot simulate a cryptosystem due to the dynamic property of the cryptosystem. Moreover, each set of cipher blocks is encrypted by a set of keys, so the total key length should be an extension of each set of keys. Therefore, even if an attacker intercepts a large amount of information and simulates a neural network system to decrypt the data, it is almost impossible to completely recover the plaintext due to the combination of extended keys. As a result, it is impossible to crack the algorithm and cipher in the neural network system by brute force and hence the cryptosystem in this solution is able to prevent the attack from attackers.

In addition, the invention can also resist chosen-plaintext attack. The chosen-plaintext attack means that the attacker pretends to be the sender, then sends information to the receiver and crack the transmitted information by capturing packets. In the chosen-plaintext attack, the attacker can guess part or all of the keys, which is a non-negligible attack for the cryptographic algorithms based on mathematical theory. However, the method of the present disclosure actually contains multiple keys, such as neural network structure, neural network training algorithm, and weight parameters of the neural network. Thus, it is impossible for an attacker to obtain keys by the chosen-plaintext, unless he is very clear about the neural network system. Let κ be a channel composed of plaintext, cipher blocks and keys, i.e., κ={($T_p$,$T_c$),$K_p$}, where $T_p$, $T_c$ and $K_p$ denote the plaintext, cipher and key, respectively. The probability of getting $K_p$ by an attacker using blocks ($T_p$, $T_c$) is very low in case of the keys consisting of multiple keys and private keys. Especially, the probability for quantum information is lower, due to the fact that under the same conditions, quantum cipher ambiguity is higher than classical cipher ambiguity and legal measurement bases is introduced. According to the analysis, when the number of the groups of legal measurement bases is 2, and the number of cipher blocks is 10, then the success probability of eavesdropping on the correct cipher is 0, that is, the success probability of the chosen-plaintext attack is 0, i.e., p($K_p$|($T_p$, $T_c$))=0. The mutual information between ($T_p$, $T_c$) and $K_p$ can be denoted as follows:

$$I((T_p, T_c), K_p) = \sum p((T_p, T_c), K_p) \log \frac{p(K_p | (T_p, T_c))}{p(K_p)} = 0,$$

where I(($T_p$, $T_c$)$K_p$,)=0 indicates that κ is perfect and confidential. Hence the scheme can resist the chosen-plaintext attack.

The reasons why the quantum neural network can accelerate data processing are listed as follows:

1) Due to the superposition of quantum states, in case of the same amount of bits, non-orthogonal quantum states can carry more information than classical bits, that is, the ι classical bits can carry ι bits of data, while the ι quantum bits can carry 2ι or even more bits of information;

2) There is not the process of key agreement in the whole communication, which can save the time of communication;

3) There is a high key utilization rate. In the quantum "one-time pad" algorithm, it is necessary to generate a set of new keys to encrypt data every time, which takes lots of time. The number of neurons is defined as n, the average operand required by one neuron is denoted as m, and the total input of neuron network is denoted as I. Therefore, the minimum key utilization rate can be denoted as $$\mu = \frac{I}{mn}.$$

Due to the learning process in neuron network, the times of updating weight will decrease as the times of encryption increases (it is considered that there is a certain correlation between plaintext blocks, so there also is a certain correlation between the updated weights), which means the speed of encrypting data can become faster and faster. The minimum key utilization rate μ begins to increase with the decreasing of the value of mn.

In conclusion, the proposed method not only guarantees the high security of information, but also can improve the key utilization rate and accelerate the efficiency of encryption and decryption.

What is claimed is:

1. An encryption and decryption method based on a continuous-variable quantum neural network (CVQNN), comprising:

updating, by the CVQNN, a weight of the CVQNN with a training sample;

triggering, by a sender, a legal measurement bases synchronization (LMB) between the sender and the CVQNN;

converting, by the sender, information to be sent into a quadratic plaintext according to the LMB, and sending the quadratic plaintext to the CVQNN;

encrypting, by the CVQNN, a received quadratic plaintext, and sending an encrypted quadratic plaintext to a receiver; and after receiving the encrypted quadratic plaintext, sending, by the receiver, the encrypted quadratic plaintext to the CVQNN for decryption to obtain decrypted information.

2. The method according to claim 1, wherein the updating, by the CVQNN, of the weight of the CVQNN with a training sample, comprises:

repeatedly updating, by the CVQNN, the weight of the CVQNN according to the training sample until a loss value of the CVQNN loss function is less than a preset threshold.

3. The method according to claim 2, wherein the repeatedly updating, by the CVQNN, of the weight of the CVQNN according to the training sample until a loss value of the CVQNN loss function is less than a preset threshold, comprises:

repeatedly updating, by the CVQNN, the weight of the CVQNN according to the training sample using Adam optimization algorithm, until the loss value of the CVQNN loss function is less than the preset threshold.

4. The method according to claim 1, wherein the triggering, by the sender, of the legal measurement bases synchronization between the sender and the CVQNN, comprises:

generating, by the sender, a quantum state according to first measurement bases set and selected randomly, and sending a generated quantum state to the CVQNN;

measuring, by the CVQNN, a received quantum state by using second measurement bases set and selected randomly, to obtain a first serial number, and sending the first serial number to the sender;

determining, by the sender, synchronized measurement bases according to a received first serial number, and then sending the synchronized measurement bases to the CVQNN.

5. The method according to claim 1, wherein before the converting, by the sender, of the information to be sent into a quadratic plaintext according to the synchronized measurement bases, and sending the quadratic plaintext to the CVQNN, the method further comprises:

sending, by the sender, the information to be sent to the CVQNN;

if the CVQNN determines that the information to be sent is quantum state information, then sending the quantum information back to the sender; and if the CVQNN determines that the information to be sent is bit information, converting the bit information into the quantum state information through a displacement gate in vacuum state, and sending a converted quantum information to the sender.

6. The method according to claim 1, wherein the encrypting, by the CVQNN, of the received quadratic plaintext, and sending the encrypted quadratic plaintext to the receiver, comprises:

calculating an expected value for an outputted data of the CVQNN according to the received quadratic plaintext;

calculating a value of a first error correction function according to the expected value;

combining a first hidden output of the CVQNN with the value of the first error correction function to obtain the encrypted quadratic plaintext; and sending the encrypted quadratic plaintext to the receiver through a communication channel.

7. The method according to claim 1, wherein after receiving the encrypted quadratic plaintext, the sending by the receiver the encrypted quadratic plaintext to the CVQNN for decryption to obtain decrypted information, comprises:

parsing, by the receiver, the encrypted quadratic plaintext to obtain values of the second hidden output and the second error correction function of the CVQNN;

sending, by the receiver, the second hidden output to the CVQNN, and receiving an output result returned by the CVQNN; and determining, by the receiver, the quadratic plaintext according to the output result and the value of the second correction function, and determining the decrypted information according to the quadratic plaintext.

8. The method according to claim 7, wherein after the sending by the receiver of the encrypted quadratic plaintext to the CVQNN again for decryption to obtain decrypted information, the method further comprises:

sending, by the receiver, the determined quadratic plaintext to the CVQNN again, and receiving a third hidden output returned by the CVQNN;

determining, by the receiver, that the information to be sent has not been maliciously modified, if the third hidden output is the same as the second hidden output; and determining, by the receiver, that the information to be sent has been modified, if the third hidden output is different from the second hidden output.

9. An encryption and decryption system based on a continuous-variable quantum neural network (CVQNN), comprising:

a sender,
the CVQNN, and
a receiver, wherein:
the CVQNN is configured to update a weight of the CVQNN with a training sample;

the sender is configured to trigger measurement bases synchronization between the sender and the CVQNN;

the sender is configured to convert the information to be sent into a quadratic plaintext according to synchronized measurement bases, and send the quadratic plaintext to the CVQNN;

the CVQNN is configured to encrypt a received quadratic plaintext and send an encrypted quadratic plaintext to the receiver; and the receiver is configured to send, after receiving the encrypted quadratic plaintext, the encrypted quadratic plaintext to the CVQNN for decryption to obtain decrypted information.

10. The system according to claim 9, wherein the CVQNN is further configured to:

repeatedly update the weight of the CVQNN according to the training sample until a loss value of the CVQNN loss function is less than a preset threshold.

11. The system according to claim 10, wherein the CVQNN is further configured to:

repeatedly update the weight of the CVQNN according to the training sample using Adam optimization algorithm, until the loss value of the CVQNN loss function is less than the preset threshold.

12. The system according to claim 9, wherein the sender is further configured to:

generate a quantum state according to a first measurement bases set selected randomly, and send a generated quantum state to the CVQNN; and wherein the CVQNN is further configured to measure the received quantum state using a second measurement bases set selected randomly to obtain a first serial number, and sending the first serial number to the sender; and the sender is further configured to determine the synchronized measurement bases according to a received first serial number, and then send the synchronized measurement bases to the CVQNN.

13. The system according to claim 9, wherein the sender is further configured to:

send the information to be sent to the CVQNN; and wherein the CVQNN is further configured to send quantum state information back to the sender if the CVQNN determines that the information to be sent is the quantum state information; convert, if the CVQNN determines that the information to be sent is bit information, the bit information into the quantum state information through a displacement gate in vacuum state, and send a converted quantum information to the sender.

14. The system according to claim 9, wherein the CVQNN is further configured to:

calculate an expected value for an outputted data of the CVQNN according to the received quadratic plaintext;

calculate a value of a first error correction function according to the expected value;

combine a first hidden output of the CVQNN with the value of the first error correction function to obtain the encrypted quadratic plaintext; and send the encrypted quadratic plaintext to the receiver through a communication channel.

15. The system according to claim 9, wherein the receiver is further configured to:
parse the encrypted quadratic plaintext to obtain values of a second hidden output and a second error correction function of the CVQNN;
send the second hidden output to the CVQNN, and receive an output result returned by the CVQNN; and
determine the quadratic plaintext according to the output result and the value of the second error correction function, and determining the decrypted information according to the quadratic plaintext.

16. The system according to claim 15, wherein the receiver is further configured to:
send the determined quadratic plaintext to the CVQNN again, and receiving a third hidden output returned by the CVQNN;
determine that the information to be sent has not been maliciously modified if the third hidden output is the same as the second hidden output; and
determine that the information to be sent has been modified if the third hidden output is different from the second hidden output.

* * * * *